United States Patent Office 2,713,019
Patented July 12, 1955

2,713,019

ANTIBIOTIC PHARMACEUTICAL PREPARATION CONTAINING POLYETHYLENE GLYCOL DIESTER AS VEHICLE

Sampson F. Jeffries, Indianapolis, Ind., assignor to Allied Laboratories, Inc., Kansas City, Mo., a corporation of Delaware No Drawing. Application January 31, 1951, Serial No. 208,846

5 Claims. (Cl. 167—58)

This invention relates to ointment bases and/or vehicles for substances which deteriorate in the presence of moisture. More particularly, it relates to a substantially anhydrous ointment base containing at least 50% of difatty acid esters of a polyethylene glycol. Further, it relates to ointment bases containing at least 50% of difatty acid esters of polyethylene glycols, wherein the fatty acids have from 12 to 18 carbon atoms and the polyethylene glycols have a molecular weight of from 200 to about 600.

In the past, it has usually been the practice to employ anhydrous ointment bases of the grease-type as vehicles for substances which deteriorate in the presence of moisture; for example, the antibiotic bacitracin is marketed in an ointment base comprising a mixture of wool fat and petrolatum in order to preserve the activity of the bacitracin. Many water-soluble medicaments do not readily diffuse from the grease-type ointment base, and numerous investigators have carried out experiments toward the development of bases from which antibiotic or other active ingredients would be more readily diffused. Some ointment bases have been developed which offer advantages over the grease-type bases; however, none of them, to my knowledge, have been proven to be completely satisfactory.

In accordance with the present invention, I have discovered that ointment bases and/or vehicles containing at least 50% of 12 to 18 carbon atom, difatty acid esters of polyethylene glycols of from 200 to 600 molecular weight are satisfactory for preserving the activity of substances which deteriorate in the presence of moisture and at the same time allow the substances to be readily diffused therefrom. Obviously, when additional modifying substances are added to my base, they must be compatible with the active ingredients and substantially free of water.

In preparing my ointment base, 50% or more of a 12 to 18 carbon atom, difatty acid ester of polyethylene glycol of from 200 to 600 molecular weight is usually mixed with suitable modifying substances. In some cases, the modifying substances may be omitted entirely. The modifying substances include those such as the synthetic-type glyceryl waxes, petrolatum, mineral oil, and the like. The individual ingredients may be rendered anhydrous prior to incorporation in the ointment base, or the finished ointment base may be rendered substantially anhydrous by known methods. One such method involves heating the ointment base at a temperature of about 130° C. with stirring for an hour or more.

The 12 to 18 carbon atom, difatty acid esters of polyethylene glycols vary in consistency from liquids to soft or waxy solids at room temperatures. By selecting a particular difatty acid ester of polyethylene glycol, or a combination of esters, the consistency of the vehicle may be varied so as to suit the requirements of different climatic conditions and to adjust the consistency of the completed product, depending upon the amount and nature of the modifying substances and medicinal materials being added. I have found that mixtures of polyethylene glycol 400 distearate and polyethylene glycol 400 dilaurate are exceptionally well suited for the preparation of my ointment bases. The following specific examples will illustrate methods for the preparation of ointments in accordance with my invention.

EXAMPLE I

Twenty-four grams of polyethylene glycol 400 distearate, 24 gm. polyethylene glycol 400 dilaurate, and 12 gm. Glycowax S932 (a glyceryl stearate) were placed in a clean sterile, dry vessel and heated to melt. The mixture was stirred constantly while cooling at room temperature. After adding 600,000 units polymyxin and 30,000 units bacitracin, the product was milled to a uniform consistency.

EXAMPLE II

Twenty-four grams polyethylene glycol 400 distearate, 24 gm. polyethylene glycol 400 dilaurate, and 12 gm. Glycowax S932 (a glyceryl stearate) were placed in a clean sterile dry vessel and heated to melt. The mixture was stirred constantly while cooling to room temperature. Polymyxin (600,000 units) and 30,000 units bacitracin, and 0.6 gm. 2-diethylaminoethylhexyloxy-benzilate hydrochloride (a local anesthetic) were added to the cooled mixture, and the product was milled to a uniform consistency.

EXAMPLE III

Three pounds white mineral oil U. S. P. Superla #9, 3 lb. white petrolatum U. S. P., 2 lb. 13 oz. 78 gr. Glycowax S932 (a glyceryl stearate), 2 lb. 13 oz. 78 gr. polyethylene glycol distearate, and 18 lb. 5 oz. 280 gr. polyethylene glycol 400 dilaurate were placed in a clean dry sterile vessel. The mixture was heated to approximately 125° C., and maintained at that temperature with occasional stirring for 2 hours. The mixture was allowed to cool to approximately 55–60° C. It was then gently stirred until it cooled to approximately 40–45° C. To 3 lb. of this base was added 119,750,520 units polymyxin and 5,987,520 units bacitracin. The product was mixed well and milled. Enough of the above base was added to make 30 lb., and mixed again to complete the preparation.

EXAMPLE IV

Seventeen grams Glycowax S932, 34 gm. polyethylene glycol 400 distearate, 34 gm. polyethylene glycol 400 dilaurate were placed in a clean dry sterile vessel, heated to 105–110° C. for 2 hours, and then cooled to 45° C. Penicillin G potassium (1,204,500 units) was added and stirred well. This mixture was dispensed in tubes each containing 7.5 gm. of ointment representing 100,000 units of penicillin.

In the foregoing examples, instead of the preferred combination of polyethylene glycol 400 dilaurate and polyethylene glycol 400 distearate, I may use only one of them, or combinations, or one of the following: polyethylene glycol 200 dilaurate, polyethylene glycol 400 dioleate, polyethylene glycol 600 dioleate, polyethylene glycol 600 distearate, and the like, depending upon the consistency desired and proportion of modifying substance, if any, to be added.

To demonstrate the stability and diffusibility of bacitracin and polymyxin in my ointment base as compared to other commonly employed ointment bases, the following investigations were carried out:

*Stability tests*

The ointments used in the comparative stability studies were as follows:

4730—a carbowax ointment:

| | Parts |
|---|---|
| Carbowax 4000 | 32.26 |
| Carbowax 1540 | 32.26 |
| Carbowax 1000 | 32.26 |
| Polyethylene glycol 400W | 103.00 |

To the mixture was added 500 units of bacitracin and 10,000 units of polymyxin B per gram.

4731—an emulsifiable grease base ointment:

| | Parts |
|---|---|
| Anhydrous lanolin | 40 |
| White petrolatum | 150 |
| Span 20 (sorbitan monolaurate) | 10 |

To the mixture was added 500 units of bacitracin and 10,000 of polymyxin B per gram.

4732—a grease base ointment:

| | Parts |
|---|---|
| Anhydrous wool fat | 14.7 |
| White petrolatum | 53.1 |
| Liquid petrolatum | 32.2 |

This mixture was made anhydrous by heating in the presence of anhydrous sodium sulfate for two hours and strained to remove the sodium sulfate.

To the anhydrous mixture was added 500 units of bacitracin and 10,000 units of polymyxin B per gram.

19650433—a polyethylene glycol diester ointment:

| | Parts |
|---|---|
| Polyethylene glycol 400 dilaurate | 60 |
| Polyethylene glycol 400 distearate | 10 |
| White petrolatum | 10 |
| Liquid petrolatum | 10 |
| Glycowax S932 (a glyceryl stearate) | 10 |

This mixture was heated at about 130° C. for 2 hours cooled and 435 units bacitracin and 8,700 units polymyxin B per gram were added.

Samples of the above ointments were stored at 25° C. and analyses carried out to determine the stability of polymyxin and bacitracin. The results are summarized in Table I.

TABLE I.—STABILITY OF POLYMYXIN AND BACITRACIN IN VARIOUS OINTMENT BASES

| Ointment No. | Starting Concentration in units/gm. | | Concentration found after 1 day in units/gm. | | Concentration found after 30 days in units/gm. | | Concentration found after 60 days in units/gm. | |
|---|---|---|---|---|---|---|---|---|
| | Bac. | Poly. B. | Bac. | Poly. B. | Bac. | Poly. B. | Bac. | Poly. B. |
| 4730 | 500 | 10,000 | 280 | 11,000 | 85 | 11,200 | 70 | 11,100 |
| 4731 | 500 | 10,000 | 450 | 10,000 | 130 | 9,400 | 72 | 7,700 |
| 4732 | 500 | 10,000 | 620 | 11,150 | 630 | 9,400 | 650 | 10,600 |
| 19650433 | 435 | 8,700 | 500 | 9,500 | 430 | 9,700 | 432 | 10,070 |

The stability tests show that polymyxin B is stable in each of the four bases tested, and that bacitracin is only stable in the grease base and in my polyethylene glycol diester base.

*Diffusion tests*

Diffusion studies were also carried out on the above ointments in which the ointments and standard water solutions in steel cylinders were very lightly embedded in the top layer of agar plates and the amount of diffusion measured. Details of the experimental procedure were:

| | To measure bacitracin Diffusion | To measure polymyxin Diffusion |
|---|---|---|
| Leveling agar | 20 ml. bacitracin assay medium (FDA) containing 2% agar. Plates of 90 mm. diameter. | 20 ml. trypticase soy broth containing 2% agar. Plates of 90 mm. diameter. |
| Seed agar | 4 ml. bacitracin assay medium (FDA) containing 1.5% agar. | 4 ml. trypticase soy broth containing 1.5% agar. |
| Seed organism | Micrococcus flavus. | Brucella bronchiseptica. |
| Standard used | 7 step serial dilutions of distilled water solution of bacitracin. Highest concentration, 38.5 u./ml. | 8 step serial dilution of distilled water solution of polymyxin B sulfate. Highest concentration, 10,000 u./ml. |
| Seeding rate | As per FDA method for cylinder assay of bacitracin. | 1% of 20 hour trypticase soy broth culture of Brucella bronchiseptica. |
| Incubation | 2 hours at room temperature before adding samples; thereafter at 37° C. for 18 hours. | 2 hours at room temperature before adding samples; thereafter at 37° C. for 18 hours. |

TABLE II.—DIFFUSIBILITY OF POLYMYXIN B AND BACITRACIN FROM OINTMENT BASES

| Ointment No. | Bacitracin Diffusibility | | Polymyxin Diffusibility | |
|---|---|---|---|---|
| | Radius of zone of inhibition in mm. | Equiv. to water soln. containing u./ml. | Radius of zone of inhibition in mm. | Equiv. to water soln. containing u./ml. |
| 4730 | (*) | | 7.0 | 8,000 |
| 4731 | (*) | | 0 | 156 |
| 4732 | 4.2 | 3.63 | 0 | 156 |
| 19650433 | 6.6 | 16.8 | 3.7 | 930 |

*Bacitracin destruction was so very rapid in these bases that studies of bacitracin diffusibility were not considered warranted.

These tests clearly show that polymyxin diffusibility is satisfactory only from the carbowax base and my polyethylene glycol base and that bacitracin diffusion is greatest from my polyethylene glycol diester base.

The following investigations for efficacy on my ointments containing polymyxin and bacitracin in experimental wound infections were also carried out. Wounds were made by removing circular areas of skin from the dorsum of each of three rabbits, leaving the deep fascia intact. The wounds of one rabbit were infected with the Barlow strain of *Staphylococcus aureus*, those of a second rabbit with *Pseudomonas aeruginosa*, and the wounds of a third rabbit with a mixture of these two organisms. Two types of ointments were used for treatment: #4429 which is the ointment of Example I, and #4447 which is the ointment of Example II. All wounds were treated once daily for three consecutive days. Antibacterial effects of the ointments were determined daily by subculture. Both ointments were effective in controlling the single infections as well as the mixed infection.

It will thus be seen that my ointment bases containing at least 50% of a 12 to 18 carbon atom difatty acid ester of polyethylene glycols of from 200 to 600 molecular weight are excellent vehicles for the antibiotics polymyxin and bacitracin. It is to be distinctly understood that my invention also includes the incorporation of any other medicament which is subject to deterioration by water or which is not satisfactorily diffused from grease-type bases.

In the specific examples, I have employed the preferred percentages of from about 70% to 80% of the 12 to 18 carbon atom difatty acid esters of polyethylene glycols of from 200 to 600 molecular weight. I have determined, however, that these percentages can be varied considerably to give satisfactory ointment bases and/or vehicles for water sensitive medicaments.

I have prepared products containing from 50% to 90% of a 12 to 18 carbon atom difatty acid ester of polyethylene glycols of from 200 to 600 molecular weight and containing from 10% to 50% of petrolatum or liquid petrolatum. These products are suitable as carriers for water sensitive substances such as bacitracin, polymyxin, and urea peroxide.

In the specific instance, a liquid vehicle was prepared by mixing 10 parts of liquid petrolatum, 10 parts of petrolatum, 20 parts of polyethylene-glycol 400 distearate and 60 parts of polyethylene glycol 400 dilaurate. This liquid vehicle is an excellent carrier for polymyxin, and bacitracin.

I claim:

1. A pharmaceutical preparation including a vehicle which comprises a mixture containing at least 50% of 12 to 18 carbon atoms difatty acid esters of polyethylene glycols of from 200 to 600 molecular weight and at least 10% of a pharmaceutical carrier comprising substantially anhydrous modifying substances and containing minor quantities of polymyxin and bacitracin.

2. A pharmaceutical preparation including a vehicle which comprises a mixture containing at least 50% of 12 to 18 carbon atoms difatty acid esters of polyethylene glycols of from 200 to 600 molecular weight and at least 10% of a pharmaceutical carrier comprising substantially anhydrous modifying substances and containing a minor quantity of polymyxin.

3. A pharmaceutical preparation including a vehicle which comprises a mixture containing at least 50% of 12 to 18 carbon atoms difatty acid esters of polyethylene glycols of from 200 to 600 molecular weight and at least 10% of a pharmaceutical carrier comprising substantially anhydrous modifying substances and containing a minor quantity of bacitracin.

4. A pharmaceutical preparation including an ointment base comprising a mixture containing from about 10% to about 45% of polyethylene glycol 400 distearate and 10% to about 45% polyethylene glycol 400 dilaurate which diesters comprise at least 50% of the ointment base and at least 10% of a pharmaceutical carrier comprising substantially anhydrous modifying substances and containing minor quantities of polymyxin and bacitracin.

5. A pharmaceutical preparation including an ointment base comprising a mixture containing about 60% polyethylene glycol 400 dilaurate, about 10% polyethylene glycol 400 distearate, about 10% of a glyceryl stearate wax, about 10% white petrolatum, and about 10% white mineral oil and containing minor quantities of polymyxin and bacitracin.

References Cited in the file of this patent

UNITED STATES PATENTS

| | | |
|---|---|---|
| 2,055,063 | Bird | Sept. 22, 1936 |
| 2,269,529 | Goldsmith | Jan. 13, 1942 |
| 2,511,032 | Baker | June 13, 1950 |

FOREIGN PATENTS

| | | |
|---|---|---|
| 329,266 | Great Britain | May 5, 1930 |
| 722,619 | Germany | July 21, 1942 |

OTHER REFERENCES

Nadkarini et al.: J. A. Pharm. Assn., Sci. Ed., April 1949, pp. 216–221.

Culter: J. A. P. A., Sci. Ed., September 1948, pp. 370, 372, 374.

Bennett: The Chemical Formulary, vol. VIII, Chemical Publ. Co., Inc., Brooklyn, N. Y., 1948, pp. 36, 101.

Ann. Report Federal Security Agency, Food and Drug Administration, 1949, p. 43.

Chemicals by Glyco Pamphlet, published by Glyco Products Co., Inc., 26 Court Street, Brooklyn, N. Y. Copyright 1948, pp. 4–5.